United States Patent [19]

Mihalic

[11] 4,213,442
[45] Jul. 22, 1980

[54] VALVE SELECTOR FOR SHAFT-MOUNTED ROCKERS

[75] Inventor: William T. Mihalic, Battle Creek, Mich.

[73] Assignee: Eaton Corporation, Cleveland, Ohio

[21] Appl. No.: 811,420

[22] Filed: Jun. 29, 1977

[51] Int. Cl.² .............................................. F02D 13/06
[52] U.S. Cl. .............................. 123/198 F; 123/90.16; 123/90.27; 123/90.43
[58] Field of Search .............. 123/198 F, 90.15, 90.16, 123/90.17, 90.27, 90.28, 90.29, 90.42, 90.43

[56] References Cited

U.S. PATENT DOCUMENTS

| | | | |
|---|---|---|---|
| 2,443,999 | 6/1948 | Wright | 123/198 F |
| 2,934,052 | 4/1960 | Longenecher | 123/90.16 |
| 2,948,274 | 8/1960 | Wood | 123/198 F |
| 2,997,991 | 8/1961 | Roan | 123/90.16 |
| 3,166,057 | 1/1965 | Konrad et al. | 123/90.16 |
| 3,277,874 | 10/1966 | Wagner | 123/90.16 |
| 3,413,965 | 12/1968 | Gavasso | 123/90.16 |
| 3,422,803 | 1/1969 | Stivender | 123/90.16 |
| 3,964,455 | 6/1976 | Brown | 123/90.16 |

*Primary Examiner*—Ira S. Lazarus
*Attorney, Agent, or Firm*—R. J. McCloskey; R. A. Johnston

[57] ABSTRACT

A device for selectively disabling and enabling, while running, the combustion chamber valves of an internal combustion engine. The device is interposed in engine valve gear of the type employing a plurality of rockers mounted on a common shaft and acted upon by the cyclic application and relaxation of valve gear driving forces. Each of the rockers is pivotally mounted on the shaft by fulcrum means movable transversely with respect to the shaft for changing the rocker pivot point. The fulcrum means is mounted by latchable means movable, when the valve driving forces are relaxed, between a first and second position to permit changing of the rocker pivot for effecting disablement and enablement of the valve gear for selected valves. Actuator means selectively apply and hold a force on the latchable means and movement thereof occurs during the valve gear event upon relaxation of the driving forces.

11 Claims, 6 Drawing Figures

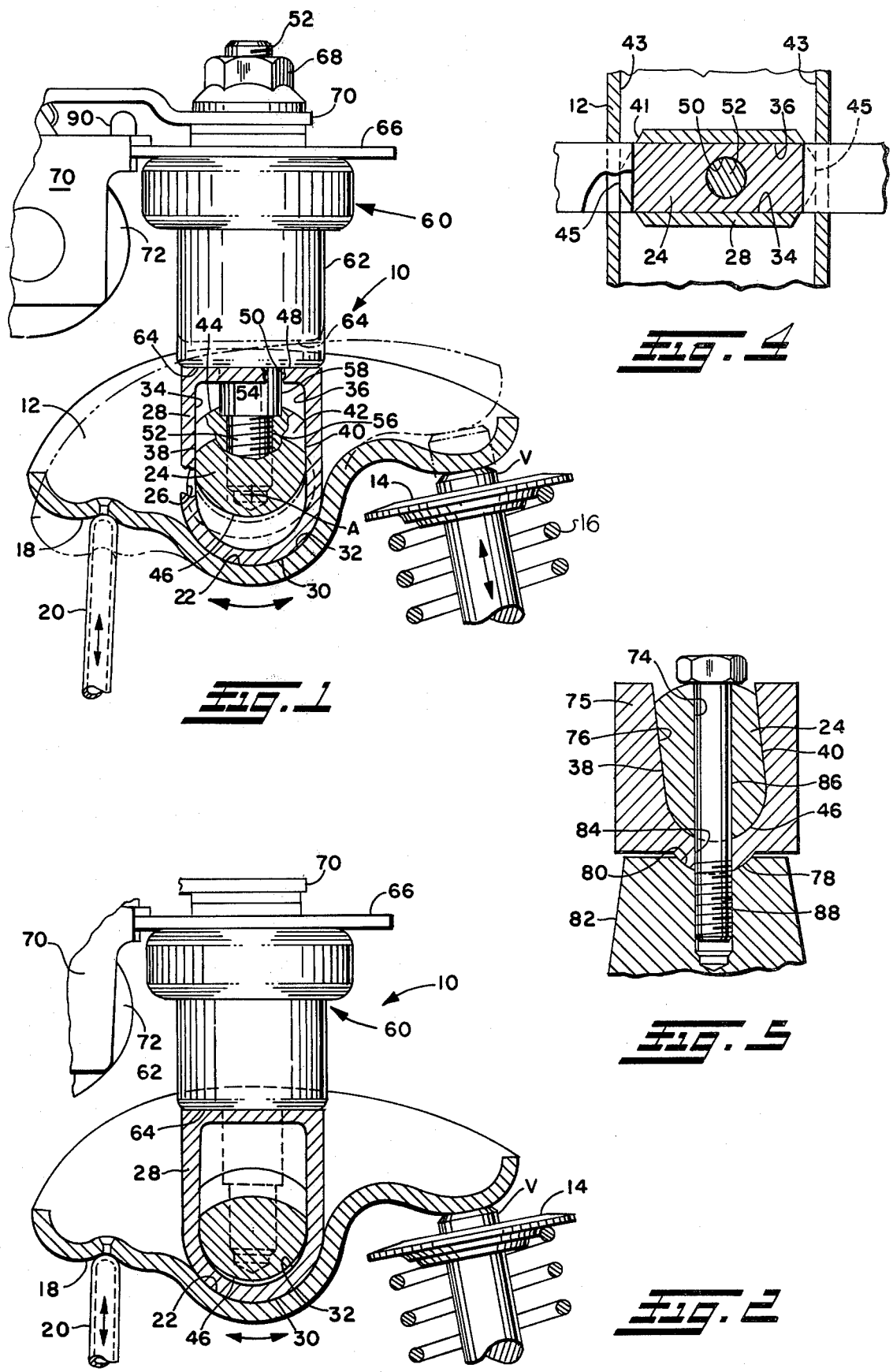

VALVE SELECTOR FOR SHAFT-MOUNTED ROCKERS

BACKGROUND OF THE INVENTION

The present invention relates to the valve gear of an internal combustion engine; and, specifically relates to mechanisms of the type known as "valve selectors", which are devices selectively operable to render totally or partially inoperative and normally operative, the combustion chamber valves of an engine. Examples of such devices are known and described as, for example, in "AUTOMOTIVE ENGINEERING", Vol. 85, No. 5, at page 30, May 1977, published by the Society of Automotive Engineers, 400 Commonwealth Drive, Warrendale, Pennsylvania 15096.

The aforementioned known device for permitting disabling and enabling of the engine valve gear while the engine is running, has been applied to valve gear of the type having individual rocker arms pivotally mounted by means of an individual rocker pivot stanchion provided on the cylinder head of the engine. This has been accomplished by providing a latchable mechanism which is movable to permit a rocker fulcrum received over the mounting stanchion to be moved therealong. Movement of the fulcrum changes the location of the rocker arm pivot and effects the pivotal motion of the rocker arm in the valve gear, resulting in changes in the manner in which the rocker arm receives and transmits to the associated valve the cyclically applied valve gear driving forces.

The latchable means is movable between a plurality of positions which permit the relocation of the rocker arm pivot fulcrum. In the operation of such a device, when it is desired to disable or re-enable the selected valves, an actuator applies and holds an actuating force on the latchable means which moves between the different positions only when the valve gear driving forces are relaxed. The latchable means is latched in the selected position upon cyclic reapplication of the valve gear driving forces. In the enabling position, the latchable means positions the fulcrum such that the rocker pivots thereabout to effect normal valve opening and closing. In the disabling position the latchable means is operative to provide lost-motion in the valve gear whereby pivotal movement of the rocker, upon cyclic application of the valve gear forces, is not effective to open the selected valves.

It will be readily understood to those familiar with internal combustion engines having overhead type valve gear, that such a valve selector mechanism is readily adaptable to engines having each valve rocker arm fulcrum mounted on individual studs or stanchions. However, a substantial number of internal combustion engines utilize valve gear in which the valve rocker arms are pivotally received over a common shaft, usually running the length of a bank of cylinders. In this type of valve gear arrangement, the shaft is attached to the cylinder head in a manner preventing movement of the shaft and each of the rocker arms have a bore therein which registers in sliding engagement over the outer periphery of the shaft. It will be apparent that the shaft-mounted rocker type valve gear does not readily lend itself to incorporation of a latchable means for permitting selective location of the rocker arm pivot, since the rocker shaft is the fulcrum for each of the rocker arms in the entire bank of combustion chambers or cylinders.

For this reason, it has been desired to find a way in which the valve selector type disabling and re-enabling mechanism could be employed in multi-chambered engines of the type having overhead valve gear with rocker arms mounted on a common shaft for the chambers in each bank. In particular, it has been desired to find a way to incorporate valve selectors in the valve gear of a rocker-shaft type without requiring redesign or reworking of the rocker shaft mounting stanchions and the consequent re-tooling for manufacturing the cylinder heads of such engines.

SUMMARY OF THE INVENTION

The present invention provides a solution to the above-described problem of providing a means for enabling and disabling the combustion chamber valves of a multi-chambered engine having overhead valve gear of the type utilizing shaft-mounted rocker arms. The device of the present invention continues to employ a shaft running the length of a cylinder bank for providing common mounting of the valve gear rocker arms for each of the cylinders of that bank. In one embodiment of the invention the conventional straight cylindrical configuration of the rocker shaft is maintained; and, the rocker arms in this embodiment require elongation of the conventional circular aperture therein having the shaft received therethrough. In another embodiment of the invention the rocker shaft has a plurality of longitudinally spaced lugs provided thereon and the rocker arm maintained a conventional substantially circular aperture through which the rocker arms are received over the rocker shaft.

In both of the aforementioned embodiments of the invention, a fulcrum means is movably attached to the shaft for motion in a direction transversely of the longitudinal direction of the shaft. The fulcrum means includes a collar member having an elongated aperture formed therein with the shaft received through the elongated aperture.

The fulcrum means, in the presently envisioned embodiments of the invention, is retained in selected positions by latchable means movable between a plurality of positions upon cyclic relaxation of the valve gear driving forces. Upon cyclic reapplication of the valve gear driving forces to the rocker arm, the rocker arm is pivotally supported on the outer surface of the fulcrum collar. The latchable means maintains the selected position of the fulcrum and thus determines the effect of the pivotal movement of the rocker arm in the valve gear train.

BRIEF DESCRIPTION OF THE DRAWINGS

FIG. 1 is a cross-sectional view taken transversely through the rocker shaft of the overhead valve gear of an engine showing the rocker fulcrum in a position for effecting normal opening of the engine valve;

FIG. 2 is a partial sectional view similar to FIG. 1 illustrating the fulcrum means in a position permitting lost-motion movement of the rocker for disabling valve movement;

FIG. 4 is a partial section view taken along section-indicating lines 4—4 of FIG. 3;

FIG. 5 is a partial section view taken along section-indicating lines 5—5 of FIG. 3; and, FIG. 6 is a partial section view, similar to FIGS. 1 and 2, showing another embodiment of the invention utilizing elongated apertures in the rocker arms and a straight cylindrical rocker shaft.

DETAILED DESCRIPTION

Figure 3:
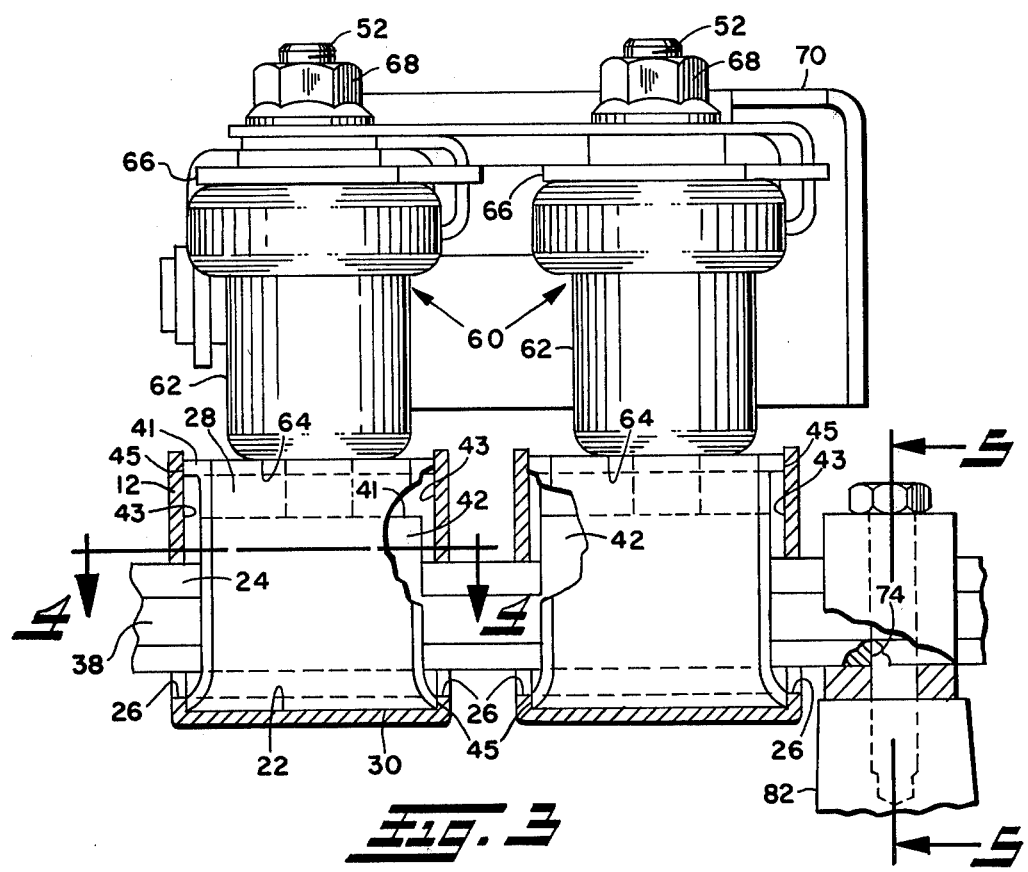
FIG. 3 is an elevation view of the embodiment of FIGS. 1 and 2 showing the mounting of the fulcrum means on a rocker shaft and the mounting of the shaft on the engine.

Referring now to FIG. 1, the device indicated generally 10 of the present invention is illustrated as installed in conventional pushrod-type overhead valve gear of an internal combustion engine. A combustion chamber valve stem denoted V in FIG. 1 contacts one end of a rocker arm 12, the valve stem V having a valve spring 16 received over the valve stem V and conventional spring keeper 14 retained thereon with one end of spring 16 registering against the undersurface of keeper 14 so as to urge the valve stem in an upward direction to the closed position. The opposite end of the rocker arm 12 has a recess 18 formed therein having one end of a pushrod 20 registered therein for transmitting valve gear driving forces to the rocker. The rocker arm 12 has a pivot surface 22 having a preferably semicylindrical configuration formed therein intermediate the ends thereof. A stationary rocker shaft 24 is received through a substantially circular aperture 26 provided in the rocker arm 12. A fulcrum means 28, preferably in the form of a transversely elongated collar or sleeve, is received over the shaft 24 and has the lower portion of the outer periphery thereof forming a fulcrum pivot surface 30 configured so as to nest with and register against the rocker pivot surface 22 in sliding engagement therewith. The lower portion 32 of the transverse inner periphery of the fulcrum means 28 is configured to conform to the outer periphery of the shaft 24 and is adapted to nest in closely spaced arrangement as will be hereinafter described in detail.

In FIG. 1 the fulcrum means 28 is illustrated in the lower position in which the fulcrum pivot surface 30 engages the rocker arm pivot surface 22 so that the rocker arm pivots about point A with respect to the shaft 24, such that sliding movement between the fulcrum surface 30 and rocker surface 22 moves the valve from the open position shown in solid outline in FIG. 1 to the closed position shown in dashed outline for the valve stem, rocker arm and pushrod in FIG. 1.

Referring now to FIGS. 1, 3 and 4, the fulcrum means 28 is shown received within the side walls of the rocker arm 12 which is of a well-known configuration having a generally U-shaped transverse section with spaced parallel sidewalls. The shaft 24 is received through the hollow center portion of the fulcrum means 28. The fulcrum means 28 has the inner periphery thereof configured so as to have the central portion thereof arranged in spaced parallel flat sides 34, 36 respectively, which register in sliding contact with a corresponding pair of spaced parallel flats 38, 40, respectively, formed generally vertically along the shaft means 24.

With reference to FIGS. 3 and 4, the ends of the fulcrum means 28 are preferably tapered in a chamfered surface 41, leaving a flat end surface 45 spaced longitudinally in parallel relationship and registering in slip fitting arrangement with the inside surfaces 43 of the side-walls of the rocker arm 12. The flat ends 45 of the fulcrum means thus position the rocker arm at the desired longitudinal station along the shaft means 24.

Referring to FIG. 3, the shaft means 24 has disposed in longitudinally spaced relationship therealong a plurality of guide lugs 42 with each lug extending vertically from the surface of the shaft means 24 and having the upper surface 44 thereof curved in transverse section to conform to the curvature of the aperture 26 in the rocker arm 12.

As mentioned before the lower portion 46 of the periphery of the shaft means 38 is also configured in transverse section to conform to the curvature of rocker aperture 26. The fulcrum means 28 has the upper portion of the outer periphery formed to a substantially flat planar surface 48 disposed generally normal to the side surfaces 34, 36 with the flat surface 48 having an aperture 50 formed centrally therethrough. With reference to FIG. 1, a suitable fastening means as, for example, shouldered threaded stud 52 is received through the aperture 50 formed in each of the fulcrum means, with the shoulder of the stud registering against the bottom of a counterbore 54 formed in a threaded bore 56 provided generally vertically and transversely in the shaft means 24 at each longitudinal rocker arm station. The fulcrum means is thus slidably received over the side flats 38, 40 of the shaft means 24 and is slidably guided thereon by a smooth-surface shank portion 58 of the retaining bolt or stud 52 in sliding registration with aperture 50.

A latchable means 60 is received over the retaining stud 52, the latchable means including a movable stop member 62 having the lower surface thereof 64 formed in substantially flat configuration and registered against the flat surface 48 of the fulcrum means. Latchable means 60 further includes a latch plate 66 rotatable with respect to the mounting stud 52 and operative, upon rotation, to move the internal latching mechanism thereof (not shown) between a plurality of operating positions. The details of the internal latching mechanism are omitted here for the sake of brevity, but it will be understood that the mechanism is of the known type described in the aforementioned prior S.A.E. publication. The latchable mechanism 60 and rotatable plate 66 are retained on the mounting stud 52 by any suitable fastening means as, for example, nut 68 threadedly received over the upper end of stud 52. A suitable mounting bracket 70 is also received over the stud 52 and retained thereon by nut 68, with the bracket 70 having mounted thereon a suitable actuator as, for example, the electromagnetic force actuator 72 in the form of a solenoid. The actuator 72 has the armature thereof operatively connected to a rotatable plate 66 to effect rotary motion of the plate 66 upon electrical energization of the solenoid 72. Such a known arrangement of force actuator is described adequately in the aforementioned published teachings, and further discussion herein will be omitted for brevity.

Referring to FIGS. 3 and 5, the shaft means 24 has additional mounting apertures, indicated typically at 74, spaced longitudinally thereon intermediate the valve rocker locations. A mounting bracket 75 has a slot 76 formed therein with a generally U-shaped transverse configuration and with the sidewalls thereof in horizontally spaced parallel, generally vertically disposed relationship. The shaft means 24 is received in slot 76 with the sides of the slot 76 registering against the spaced flats 38, 40 of the shaft means. The bottom of the U-shaped slot 76 is contoured in transverse section so as to conform to the lower surface 46 of the shaft means which is received in nested arrangement therein. The bottom of the bracket 70 has a generally convex rib 78 provided centrally thereon which extends along the bracket in a direction longitudinally of the shaft and generally parallel thereto. The rib 78 has, in transverse section as shown in FIG. 5, a curvature conforming to that of the concave groove 80 formed in a conventional rocker shaft stanchion 82 extending from the cylinder head structure of the engine. The bracket 75 has an aperture 84 provided vertically through the bottom of groove 76, which aperture extends through the center region of rib 78 for receiving a suitable fastening means as, for example, bolt 86 therethrough. A threaded bore 88 is provided vertically in the rocker stanchion 82 with the fastening means 86 threadedly engaging the bore 88 for retaining the shaft means 24 and mounting bracket 75 securely onto the rocker stanchion 82 with the rib 78 nested in the rocker shaft mounting groove 80. The mounting bracket arrangement shown in FIGS. 3 and 5 thus permits the shaft means of the present invention to be mounted on the existing rocker shaft mounting stanchions provided on the engine, where open stanchion-type rocker shaft mounting is employed. It will be understood by those having ordinary skill in the art that the foregoing techniques of mounting the shaft means has been chosen for expediency and other techniques may be employed where convenient, the choice being determined by the configuration of the engine in which the present invention is to be incorporated.

Referring now to FIGS. 1 and 2, the device of the present invention is shown in FIG. 1 with stop 62 moved to the lowermost position with the undersurface 64 thereat registering against the top of fulcrum means 28. In the position shown in solid outline in FIG. 1, the stop 62 holds the fulcrum means 28 in its lowermost position for normal enabling of the engine valve V upon upward movement of pushrod 20 and pivotal motion of rocker arm 12 about the fulcrum surface 30. As mentioned above, the rocker, pushrod and valve are shown in solid outline in FIG. 1 with the rocker being rotated to its extreme clockwise-most position in which the valve is open at its maximum displacement. The extreme counterclockwise pivotal position of the rocker 12 is shown in phantom outline in FIG. 1 in which position the pushrod 20 is vertically lowered to its lowest position and the valve V is raised upwardy by spring 16 to its closed position. With the fulcrum means 28 in the position shown in FIG. 1, the pushrod, rocker arm and valve operate in the same manner as in the conventional valve gear using a cylindrical rocker shaft directly engaging apertures in the rocker arm.

Referring now to FIG. 2, the fulcrum means 28 is shown in its vertically extreme upward position wherein the latchable means 60 has permitted the stop member 62 to move upward in FIG. 2 under the urging of fulcrum means 28 responsive to the upward pressure of rocker arm surface 22 contacting the fulcrum surface 30 and exerting vertical forces thereon under the urging of pushrod 20 in response to cyclic application of valve gear driving forces thereto. When the fulcrum means 28 reaches the extreme upward, i.e., the position shown in FIG. 2, when the pushrod is in its uppermost position, the inner periphery 32 of the fulcrum means does not contact the lower surface 46 of the shaft means and thus the rocker arm pivots only about the end contacting valve V, and no driving forces are transmitted to the valve. This is accomplished by providing lost-motion movement of stop 62 in the upward direction as is known in the art of valve selector mechanisms; and, the latchable means 60 includes a resilient biasing means for maintaining the fulcrum means 28 biased downwardly in a direction to maintain light contact between the inner surface 30 of the rocker arm and the pivot surface 22 of the fulcrum means to prevent lash in the valve gear. The use of such a resilient biasing means is described in the aforementioned S.A.E. publication for eliminating clash of the valve gear components.

When it is desired to change the location of fulcrum 28, the solenoid 72 is energized to have the armature thereof apply an actuating force through pivotal connection 90 to the rotatable plate 66. However, those having skill in the art and familiar with the teachings of the aforesaid publication will recognize that the plate 66 cannot be rotated about the stud 52 unless the valve gear driving forces on pushrod 20 are relaxed. This is accomplished by internally latching mechanism 60 in a known manner, the details of which form no part of the present invention other than to render operative the present device in the valve gear and engine.

With reference to FIG. 1, when it is desired to disable the valve gear by movement of the fulcrum means from the position shown in solid outline in FIG. 1 to the position shown in phantom outline, the actuator 72 applies a force to rotatable plate 66; and, upon the next cyclic relaxation of the valve gear driving forces through pushrod 20, the rotatable plate 66 moves to a second position in which the latchable means 60 permits the surface 64 of stop 62 to move vertically under the urging of fulcrum means 28 and upon the next cyclic reapplication of valve gear forces. Upon the next cyclic relaxation of the valve gear forces on the rocker arm 12, the fulcrum means drops to the position shown in solid outline of FIG. 1 under the urging of surface 64 of stop 62, from the internal biasing means in the latchable means 60. Upon the next reapplication of cyclic forces on the rocker arm, the fulcrum means 28 again moves the stop surface 64 to the position indicated in phantom outline. The fulcrum means 28 continues to oscillate vertically between the position shown in solid outline and the phantom outline during each complete cycle of the valve gear driving forces. The rocker arm and fulcrum means continue to operate in this manner, absorbing by lost motion the movement of pushrod 20 and preventing opening of the valve, until the latchable means 60 is returned to its former position.

When it is desired to return the latchable means to its valve enabling position, the actuator 72 is de-energized and the plate 66 is biased to rotate to its former position, by biasing means contained within the latchable means 60 and, upon the cyclic relaxation of the valve gear driving forces, the stop plate 66 returns to its former position, and the stop member 62 is latched in its lowermost position as shown in solid outline in FIG. 1. With stop surface 64 again in the position shown in FIG. 1, the fulcrum means 28 is retained in the position shown in solid outline in FIG. 1 for permitting enablement of the valve gear and normal valve gear operation for opening and closing the valve V.

Figure 6:
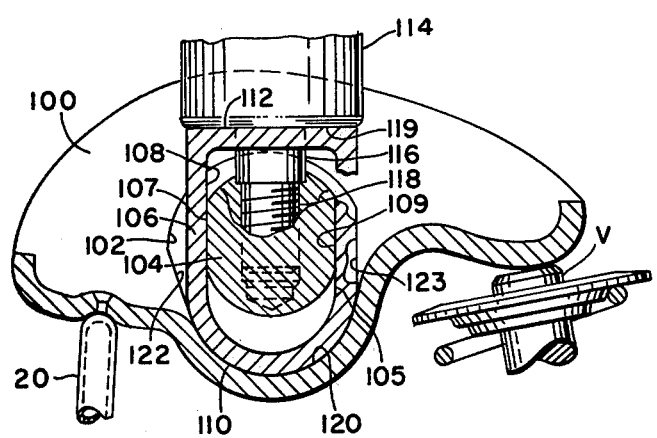

Referring now to FIG. 6, an alternate embodiment of the invention is illustrated in which the conventional rocker arm 100 is modified to have an elongated aperture 102 provided therein and the shaft means 104 is employed which retains the conventional smooth cylindrical configuration without any lugs provided thereon. In the embodiment of FIG. 6, the fulcrum means 106 is similar to the fulcrum means 28 in the embodiment of FIGS. 1 through 5 and includes generally vertically disposed spaced parallel side walls 108, 109 and a semi-cylindrical pivot surface 110 on the lower portion of the outer periphery thereof, with the top portion 112 of the outer periphery arranged in substantially flat, planar configuration. A stop member 114, similar to stop member 62 of the embodiment of FIG. 1, is received over a suitable fastening means as, for example, shouldered stud 116 which is threadedly engaged in a bore 118 formed vertically in the shaft means 104. The ends of the fulcrum means, in a direction longitudinally of the shaft means 104, are received in sliding registration with the side walls of the rocker arm 100, in a manner similar to that shown in the embodiment of FIG. 4, for locating the rocker arm 100 at the desired station along the shaft means.

In the embodiment of FIG. 6, the shaft means 104 does not have longitudinally spaced lugs extending therefrom, but instead, has a generally smooth cylindrical configuration with a pair of spaced, parallel flats 105, 107 provided thereon and extending generally vertically to form the sides on the planar shaft means. The fulcrum means 106 is received over the shaft means 104, with the side walls 108, 109 of the fulcrum means engaged in sliding registration with, respectively, the flats 107, 105 of the shaft means 104. The fulcrum pivot surface 110 has a downwardly convex semi-cylindrical configuration corresponding to the semi-cylindrical concave rocker pivot surface 120 which is nested therein.

The shaft means 104 is received through rocker aperture 102, which aperture has the periphery thereof formed to provide sufficient clearance for the rocker to rotate to the extremes of its counterclockwise and clockwise rotational movement about the pivot surface 110. In the presently preferred practice, the embodiment of FIG. 6 has the aperture 102 at the lower portion thereof conforming in curvature to the fulcrum pivot surface 110. The side portions 122, 123, respectively, of aperture 102 are formed in preferably straight configuration and diverging upwardly, with the upper portion of the aperture periphery interconnecting sides 122, 123 being curved to provide clearance for the shaft means as the rocker is pivoted to and fro during normal valve opening and closing. The embodiment of FIG. 6 thus permits a conventional rocker shaft of circular cross section to be simply reworked or modified by forming of the spaced parallel flat sides 105, 107 thereon; and, the only other modification or rework being the drilling, tapping and counterboring of the threaded apertures 118 at the rocker stations therealong for receiving fastening means 116. The individual fulcrum means 106 and modified rocker arms 100 are received over the shaft means and secured at their respective stations by fastening means in the form of stud 116. In operation, the embodiment of FIG. 6 functions in a manner similar to that of the embodiment of FIGS. 1 through 5 and the operation of the latch means to move the movable stop 114 is unchanged from the operation above described of stop 62 of the FIGS. 1-5 embodiment.

In summary, the present invention provides a unique means for incorporating in an internal combustion engine, a mechanism for enabling and disabling the combustion chamber valves while the engine is running, in an engine having overhead valve gear of the type utilizing rocker arms pivotally mounted on a common shaft for the valves associated with a plurality of combustion chambers in a single bank. The present invention readily permits adaptation of such a valve selector mechanism to rocker-shaft type valve gear by utilizing the existing rocker-shaft mounting means; and, the present invention eliminates the necessity for reworking or modifying the engine block or combustion chamber heads to accommodate the device of the present invention. In one embodiment, the present invention employs a substantially modified rocker shaft having a plurality of lugs formed thereon and uses conventional cupped rocker arms having a circular aperture therethrough received over the rocker shaft. In another embodiment the invention employs a conventional rocker shaft of circular cross section slightly modified only in that the shaft has spaced longitudinal parallel flats thereon and employs rocker arms modified to have an elongated aperture therethrough received over the rocker shaft means.

It will be apparent to those having ordinary skill in the art that the present invention, although described above in its preferred embodiments, is capable of further modification and variation and the invention is limited only by the following claims.

What is claimed is:

1. A device for selectively disabling and enabling, while running, the combustion chamber valves of an internal combustion engine of the type having valve gear operative to cyclically apply forces to the valves for effecting opening thereof and means for biasing the valve closed upon cyclic relaxation of said forces, said device comprising:
    (a) shaft means adapted for attachment to the engine;
    (b) rocker means associated with each of said valves, said rocker means being pivotally received on said shaft means, with each of said rocker means defining a rocker pivot surface and a driven surface adapted to receive said valve opening forces thereagainst and a driving surface adapted for contacting associated components of said valve gear for transmitting said valve opening forces thereto;
    (c) fulcrum means associated with each of said rocker means, said fulcrum means being movable with respect to said shaft means, said fulcrum means including means defining a fulcrum pivot surface having said rocker pivot surface in pivotal contact therewith;
    (d) means retaining each of said fulcrum means to said shaft means, said retaining means including latchable means operable in a first position to hold said fulcrum means in a first position wherein said pivotal movement of said rocker means transmits said valve opening forces to effect normal opening of said valve means, said latchable means being operable in a second position to permit lost motion movement of said fulcrum means and said rocker arm with respect to said shaft means upon said cyclic application of said valve opening forces such that said valve opening forces are not transmitted for opening said valve means; said latchable means being operable to move between said first and second positions only upon relaxation of said valve opening forces;
    (e) means for mounting said shaft means on said engine; and,
    (f) means selectively operable to apply and hold an actuating force on said latchable means for effecting movement between said first and second positions upon relaxation of said valve gear forces.

2. The device defined in claim 1, wherein,
    (a) each of said fulcrum means includes a hollow member received over said shaft means; and, (b) said shaft means includes guide means contacting each of said fulcrum means and operable to guide the movement of said fulcrum means in a direction generally transverse to the longitudinal direction of said shaft means.

3. The device defined in claim 1, wherein,
(a) each of said rocker means includes means defining a substantially circular aperture with said shaft means received therein; and
(b) said shaft means includes guide means contacting said each of said fulcrum means and operable to guide the movement of said fulcrum means in a direction generally transverse to the longitudinal direction of said shaft means.

4. The device defined in claim 1, wherein,
(a) each of said rocker means includes means defining a generally circular aperture with said shaft means received therein; and,
(b) said shaft means includes guide means operable to guide movement of said fulcrum means in a direction generally transverse to said shaft means, said shaft means including means defining a recess therein for each of said rocker means to permit clearance for said transverse movement of said fulcrum means with respect to said shaft means.

5. The device defined in claim 1, wherein,
(a) said fulcrum means include means defining a guide aperture having the axis thereof generally transverse to said shaft means, and,
(b) said retaining means includes fastening means received through said guide aperture.

6. The device defined in claim 1, wherein,
(a) said shaft means includes means defining at least one mounting aperture having the axis thereof generally transverse to the axis of said shaft means; and,
(b) said retaining means includes fastening means received through each of said mounting apertures for effecting attachment of said shaft means to said engine.

7. The device defined in claim 1, wherein,
(a) said latchable means includes a latch member rotatable about an axis substantially transverse to said shaft means; and,
(b) said actuator means includes electromagnetic means having a movable member operatively connected to said latch member.

8. The device defined in claim 1, wherein,
(a) said latch means includes a rotary member, and,
(b) said actuator moving means includes an electrically operated solenoid having a movable armature operatively connected to said rotary member.

9. The device defined in claim 1, wherein said shaft means includes an elongated member having a plurality of spaced parallel flats formed thereon and said fulcrum means includes a sleeve member received over said member, said sleeve having a pair of spaced parallel straight portions slidably contacting said flats for permitting movement of said sleeve with respect to said member in a direction generally transverse to said elongation.

10. A device for use in an internal combustion engine having a plurality of combustion chambers and valve means for controlling the flow of charge to and exhaust from each of said chambers and with said valve means being opened and closed periodically by application and relaxation of forces applied through movement of valve gear means of the type including rockers pivotally mounted on the engine for effecting said periodic operation of said valve means with each rocker having an aperture therein and adapted for receiving shaft means therein, said device comprising:
(a) shaft means received in said rocker aperture;
(b) fulcrum means associated with each of said rockers and disposed about said shaft means, said fulcrum means defining a pivot surface adapted to have said rocker pivoted thereagainst, said fulcrum means being engaged with said shaft and slidably movable with respect thereto in a direction generally transverse to the longitudinal direction of said shaft means;
(c) means retaining each of said fulcrum means to said shaft means, said retaining means including two-position latchable means operable in a first position to hold said fulcrum means in a first position whereupon said cyclic application of said valve gear forces and movement of said rocker means effectuates normal opening and closing of said valve means, said latchable means being operable in a second position to permit said slidable movement of said fulcrum means such that said pivot surface is periodically moved from said first to a second position wherein said pivotal movement of said rocker is not effective to provide said normal opening and closing of said valve means; said latchable means being movable between said first and second position only during relaxation of said valve gear driving forces;
(d) means operable to bias said fulcrum means from said second to said first position; and,
(e) means selectively operable to apply and hold an actuation force to said latchable means for effecting said movement thereof between said first and second positions during relaxation of said valve gear driving forces.

11. The device defined in claim 8, wherein said means defining an aperture in said fulcrum means includes means defining an elongated aperture having said shaft means received therethrough.

* * * * *